3,407,232
BIS(DIFLUOROAMINO)PERHALOCARBONS

Ronald A. Mitsch, Falcon Heights, Minn., assignor to Minnesota Mining and Manufacturing Company, St. Paul, Minn., a corporation of Delaware
No Drawing. Filed Apr. 16, 1962, Ser. No. 188,926
8 Claims. (Cl. 260—563)

This invention relates to certain fluorinated compounds and more particularly to a novel and useful class of nitrogen-containing fluorocarbons.

It is an object of the present invention to prepare a novel and useful class of nitrogen-containing fluorocarbon compounds. It is another object of the invention to prepare certain fluorocarbon diazo compounds. It is still another object of the invention to provide a new and valuable class of synthesis intermediates. It is a further object of the invention to provide a source of fluorocarbene diradicals. It is a still further object of the invention to provide a novel method for the preparation of perfluoroalkenes (including tetrafluoroethylene) as well as certain highly useful saturated compounds. Other objects will become apparent to those skilled in the art from reading the following specification.

The fluorocarbon diazo compounds of the invention may be represented by the formula:

wherein each R is selected from the class consisting of fluorine, perhalocarbon groups containing from 1 to 6 carbon atoms in which not less than 60 percent of the halogen atoms are fluorine and the remainder are chlorine and wherein the two R groups can combine to form five or six-membered perfluorocycloaliphatic rings through the carbon atom to which they are attached. The fluorocarbon diazo compounds thus may be alternately designated perhalocarbon diazo compounds.

The perhalocarbon groups referred to above can be perhaloalkyl groups having acyclic straight- or branched-chains, or can have cyclic structures (e.g. perfluorocyclohexyl). Similarly, two carbon atoms of the perhalocarbon group may be linked together by an oxygen atom or three carbons may be linked together by a nitrogen atom, since oxygen and nitrogen provide very stable linkages between perhaloaliphatic groups of the complete halocarbon group or structure, as is shown for instance in U.S. Patents 2,500,388 and 2,616,927.

The fluorocarbon diazo compounds of the invention include difluorodiazomethane;
perfluorodiazoethane;
perfluorodiazopropane;
perfluorodiazobutane;
perfluorodiazopentane;
3-aza-3-perfluoromethylperfluorodiazobutane;
perfluorodiazohexane;
4-oxaperfluorodiazohexane;
perfluorodiazoheptane;
perfluoro-3-diazopentane;
perfluoro-5-diazononane;
perfluoro-5-diazodecane;
perfluoro-6-diazododecane;
perfluoro-7-diazotridecane;
perfluorodiazocyclopentane;
perfluorodiazocyclohexane;
perfluorocyclohexylethyldiazomethane;
1-chloroperfluoro-2-diazoethane;
1-chloroperfluoro-2-diazopropane;
1-chloroperfluoro-6-diazoheptane;
3,4-dichloroperfluorodiazobutane;
3,5,6-trichloroperfluorodiazohexane;
3,5-dichloroperfluorodiazohexane;
1-chloroperfluoro-5-diazodecane;
1,2,6,7-tetrachloroperfluoro-4-diazoheptane; etc.

The fluorocarbon diazo compounds of the invention are relatively stable and special precautions for their handling and storage are ordinarily unnecessary. Difluorodiazomethane, the first member of the class, can be stored for extended times at ambient temperatures as a gas without difficulty and the other members of the class are correspondingly easy to store. This stability is an added advantage of the compounds.

The compounds of the invention may occur either in the form of diazoalkanes:

or in the form of diazoirenes:

but probably not in both forms. The actual isomeric form which they take is not material relative to the present case however, and, for convenience, the convention of naming them as diazoalkanes has been adopted.

The fluorocarbon diazo compounds are prepared by the reductive defluorination of a compound having the formula:

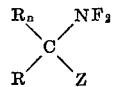

wherein the R groups are as previously defined, $n$ is an integer of the group consisting of zero and one, Z is selected from the class consisting of —NF$_2$ and =NF provided that when $n$ is zero, Z is =NF. Fluoride ion is eliminated in the reaction and a rearrangement or cyclization occurs to form the fluorinated diazo compounds. The saturated intermediates (those in which $n$ is 1) can be referred to as bis(difluoramino)perhalocarbons or bis(difluoramino) fluorocarbons. The unsaturated intermediates (those in which $n$ is 0) can be referred to as perhalocarbon amidines or perfluorofluorocarbon amidines.

Certain of the intermediate bis(difluoramino)fluorocarbons are novel and form an important facet of the invention. They may be represented by the formula:

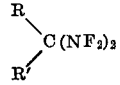

wherein R is selected from the class consisting of perhalocarbon groups containing from 1 to 6 carbon atoms in which not less than 60 percent of the halogen atoms are fluorine and the remainder are chlorine, R' is selected from the class consisting of R and fluorine and wherein R and R' can combine to form five and six membered perfluorocycloaliphatic rings through the carbon atom to which they are attached. The novel bis(difluoramino)fluorocarbons of the invention include:

1,1-bis(difluoroamino)perfluoroethane;
1,1-bis(difluoramino)perfluorobutane;
1,1 - bis(difluoramino) - 3-aza-3-perfluoromethylperfluorobutane;
3,3-bis(difluoroamino)perfluoropentane;
5,5-bis(difluoroamino)perfluorononane;
5,5-bis(difluoramino)perfluorodecane;
6,6-bis(difluoramino)perfluorododecane;
7,7-bis(difluoramino)perfluorotridecane;
1,1-bis(difluoramino)perfluorocyclopentane;
1,1-bis(difluoramino)perfluorocyclohexane;
1,1-bis(difluoramino)-2-chloroperfluoroethane;
1,1-bis(difluoramino)-5-chloroperfluoropentane;
1,1-bis(difluoramino)-7-chloroperfluoroheptane;
1,1-bis(difluoramino)-3,4-dichloroperfluorobutane;
1,1-bis(difluoramino)-3,5,6-trichloroperfluorohexane;
1,1-bis(difluoramino)-3,5-dichloroperfluorohexane;
5,5-bis(difluoramino)-1-chloroperfluorodecane;
4,4 - bis(difluoramino) - 1,2,6,7 - tetrachloroperfluoroheptane; etc.

The novel bis(difluoramino)fluorocarbons are produced either by a direct fluorination process or by electrofluorination. The starting compounds for the direct fluorination process (which is carried out in the manner described in the United States application of my co-workers S.N. 99,632, filed Mar. 30, 1961) ordinarily already contain the

portion of the bis(difluoramino)fluorocarbon. Thus, the C atom and the two N atoms of this group can be a part of a ring system (e.g. a triazine ring) or the remaining valences of the N atoms can be satisfied by groups which are replaceable directly by fluorine, e.g. hydrogen, etc. In the electrofluorination process (which is carried out in the manner described in U.S. Patent 2,519,983), the starting compounds generally already contain the $NF_2$ groups and the R and R' groups are the hydrocarbon analogs of the desired fluorocarbons. If the groups R and R' are ultimately to contain any chlorine atoms, they are usually present before the electrofluorination.

The reaction of the bis(difluoramino) fluorocarbons and the perfluorofluorocarbon amidines to form the fluorocarbon diazo compounds is carried out in the presence of a reducing agent and at from about 0 to 50° C. Although some reaction occurs in many cases below this temperature range, it is unnecessarily slow and there are no compensating advantages. At temperatures above this range, on the other hand, the speed of the reaction is often excessive and there is a possibility of the degradation of either the fluorinated reactant or the product itself. This is particularly true in the case of the fluorinated reactants since these materials are fluorine oxidizing agents which may react violently and even explosively if not handled with care. The fluorinated starting materials are generally gases or liquids at ambient temperatures and are handled with suitable techniques to avoid the use of unnecessarily high pressures. Glass or glass-lined equipment is suitable although stainless steel and other metals can also be used.

The reducing agent is preferably mixed with a solvent in which it has at least moderate solubility and which is relatively inert with respect to the reactants and the product of the reaction at the temperatures employed. The fluorinated starting material is then brought into contact with this mixture and the reaction takes place spontaneously. The reaction is generally accompanied by a mild exotherm and proceeds smoothly to completion, good to excellent yields being obtained in many cases. The length of time required for the reaction varies widely, depending upon the particular conditions selected. The fluorocarbon diazo products are gases or liquids which can then be easily volatilized from the reaction mixture and condensed in one or more suitably cooled traps.

Among the reducing agents which are suitable for use in the process of the invention are sandwich-bonded organo-metallic reducing agents, inorganic reducing agents and organic reducing agents. Reducing agents of weak and moderate strength are ordinarily preferred for reduction of the unsaturated starting compounds (the perfluorofluorocarbon amidines) while reducing agents of moderate strength are preferred for the reduction of the saturated starting compounds (the bis(difluoramino)fluorocarbons). In using either class of starting materials, the stronger reducing agents can also be used although some difficulty in controlling the reaction to obtain the desired products is often encountered. Among the particularly useful reducing agents are dicyclopentadienylmanganese (II), dicyclopentadienylruthenium (II), dicyclopentadienylnickel (II), dicyclopentadienyltitanium (II) and dicyclopentadienyliron (II) as well as substituted derivatives thereof, dicumenechromium (II), dibenzenechromium (II), potassium iodide, potassium bromide, diphenyl amine, hydroquinone, etc.

As previously noted, the solvent which is chosen for a particular reaction according to the invention will ordinarily be relatively inert with respect to the materials with which it will come into contact and will dissolve the reducing agent to an appreciable extent. Thus a mixture of 90–99% acetonitrile and 10–1% water may be used with potassium iodide (the water being needed to dissolve the potassium iodide but having a tendency to cause decomposition in the reaction mixture when used in higher concentration and consequent loss of product) while various solvents, such as xylene hexafluoride, benzotrifluoride, acetonitrile, benzene, carbon tetrachloride, tetrahydrofuran, fluorotrichloromethane, dischlorodifluoromethane, etc., can be used with the sandwich-bonded organometallic reducing agents.

The fluorocarbon diazo compounds of the invention form the corresponding fluorocarbene diradicals of the formula:

with loss of $N_2$ when photolyzed. These diradicals then combine with diradicals of the same species to form symmetrical fluorocarbon olefins. They will also combine with diradicals of other fluorocarbon diazo compounds to form assymmetrical fluorocarbon olefins and with free radicals of chlorine, fluorine, bromine, diazomethane, dinitrogen tetroxide, etc. to form a great variety of useful compounds.

The products of the photolysis of the fluorocarbon diazo compounds with halogens are useful as solvents, reaction media, extraction media, dielectrics, hydraulic fluids, heat transfer fluids, fire extinguishing agents, refrigerants and aerosol bomb propellants; the products of the photolysis of the individual simpler fluorocarbon diazo compounds are valuable monomers, as are the products of the photolysis of certain of the simpler fluorocarbon diazo compounds with diazomethane; etc. Thus, tetrafluoroethylene is prepared by photolysis of difluorodiazomethane, dichlorodifluoromethane is prepared by photolysis of a mixture of difluorodiazomethane and chlorine, vinylidene fluoride is prepared by photolysis of a mixture of difluorodiazomethane and diazomethane, perfluoropropene is prepared by photolysis of a mixture of dlifluorodiazomethane and perfluorodiazoethane, 1,1-dichlorotetrafluoroethane is prepared by photolysis of a mixture of perfluorodiazoethane and chlorine, perfluorobutene-2 is prepared by photolysis of perfluorodiazoethane and difluorodinitromethane is prepared by photolysis of a mixture of difluorodiazomethane and dinitrogen tetroxide. Preparations of other useful products from the photolysis of the fluorocarbon diazo compounds with coreactants are shown in the following table.

| Fluorocarbon Diazo Compound | Co-reactant | Photolysis Product |
| --- | --- | --- |
| Perfluorodiazopropane | $Cl_2$ | 1,1-dichloroperfluoropropane. |
| Perfluorodiazobutane | $F_2$ | Perfluorobutane. |
| Perfluorodiazopentane | $Br_2$ | 1,1-dibromoperfluoropentane. |
| Perfluorodiazohexane | $Cl_2$ | 1,1-dichloroperfluorohexane. |
| Perfluorodiazoheptane | $Br_2$ | 1,1-dibromoperfluoroeptane. |
| Perfluoro-2-diazopropane | $F_2$ | Perfluoropropane. |
| Perfluoro-3-diazopentane | $Br_2$ | 3,3-dibromoperfluoropentane. |
| Perfluoro-5-diazononane | $Cl_2$ | 5,5-dichloroperfluorononane. |
| Perfluoro-5-diazodecane | $F_2$ | Perfluorodecane. |
| Perfluoro-6-diazododecane | $Cl_2$ | 6,6-dichloroperfluorododecane. |
| Perfluoro-7-diazotridecane | $F_2$ | Perfluorotridecane. |
| Perfluorodiazocyclopentane | $Br_2$ | 1,1-dibromoperfluorocyclopentane. |
| Perfluorodiazocyclohexane | $F_2$ | Perfluorocyclohexane. |
| 1-chloroperfluoro-2-diazoethane | $Cl_2$ | 1,2,2-trichloro-1,1,2-trifluoroethane. |
| 1-chloroperfluoro-2-diazopropane | $Br_2$ | 2,2-dibromo-1-chloroperfluoropropane. |
| 1-chloroperfluoro-6-diazoheptane | $Cl_2$ | 1,6,6-trichloroperfluoroheptane. |
| 3,4-dichloroperfluorodiazobutane | $Br_2$ | 1,1-dibromo-3,4-dichloroperfluorobutane. |
| 3,5,6-trichloroperfluorodiazohexane | $F_2$ | 3,5,6-trichloroperfluorohexane. |
| 3,5-dichloroperfluorodiazohexane | $Cl_2$ | 1,1,3,5-tetrachloroperfluorohexane. |
| 1-chloroperfluorodiazo-5-decane | $F_2$ | 1-chloroperfluorodecane. |
| 1,2,6,7-tetrachloroperfluoro-4-diazoheptane | $Cl_2$ | 1,2,4,4,6,7-hexachloroperfluoroheptane. |

The following examples will more specifically illustrate the process of the invention and the compounds obtained thereby.

EXAMPLE 1

Difluorodiazomethane prepared from bis(difluoramino) difluoromethane

A dry 10 cc. capacity heavy-walled glass ampoule is charged with 4.84 g. ($2.60 \times 10^{-2}$ mole) of dicyclopentadienyliron and 6 ml. of xylene hexafluoride. This mixture is cooled to liquid nitrogen temperature and degassed by reducing the pressure in the ampoule to not more than about 0.1 millimeter of mercury. 1.62 grams ($1.04 \times 10^{-2}$ mole) of bis(difluoramino) difluoromethane (prepared by method of Ser. No. 99,632, filed Mar. 30, 1961, B.P. −32° C.) are then introduced into the ampoule by condensation, the ampoule is sealed and the reactants are allowed to come to room temperature (i.e. approximately 25° C.). The mixture is a solution of the bis(difluoramino) difluoromethane in the xylene hexafluoride with the ferrocene being only partly in solution. It is allowed to stand for 4 days at 25° C. during which time the ampoule is shaken occasionally. At the end of this period, the original orange color of the ferrocene (i.e. dicyclopentadienyliron) has been replaced by the deep blue-green color of the resulting ferricinium fluoride. The ampoule is cooled to liquid nitrogen temperature and opened. The volatile products of the reaction are fractionated by allowing the ampoule to warm gradually to room temperature while connected to a vacuum pump through −23° C., −78° C. and −196° C. receivers. The material collected in the −196° C. receiver is subjected to further separation by preparative vapor phase chromatographic trapping techniques which results in its resolution into 20.8 percent of the fluorinated starting material bis(difluoramino) difluoromethane, and 78.3 percent and 0.9 percent of two unknowns. The major unknown product is $2.88 \times 10^{-3}$ moles (calculated from the gas laws) of a pure compound, corresponding to a yield of 27.7 percent of theoretical (based on the amount of the fluorinated reactant starting material originally added). It is found to contain 15.5 percent of carbon, 48.5 percent of fluorine and 35.8 percent of nitrogen and to have a molecular weight of 77. This corresponds to an empirical formula of $C_{1.01}F_{1.99}N_{2.00}$. The calculated elemental analysis values for the empirical formula $C_1F_2N_2$ corresponding to the above are 15.4 percent, 48.7 percent, and 35.9 percent, respectively, and the calculated molecular weight is 78. The boiling point of this compound (calculated by extrapolation from the vapor pressure curves) is −91.3° plus or minus 1° C.

This product is also subjected to analysis by nuclear magnetic resonance shielding values ($CFCl_3$ is employed as an internal standard, as described by Filipovich et al., Journal of Physical Chemistry, vol 63, pp. 761–762, 1959, the $\phi^*$ values defined by those authors being given simply at $\phi$ values) as well as mass spectrometer and infrared analyses. A single $F^{19}$ nuclear magnetic resonance absorption peak at $+122.5\phi$ (normal $-CF_2$ region) is observed. This eliminates the possible structural isomers other than the one which contains the $-CF_2$ moiety. Thus, rearrangement has occurred and the unknown product is $CF_2N_2$. The mass spectrometer and infrared analyses support this structure.

The continuous preparation of difluordiazomethane is accomplished as follows: The reactor includes two gas-flow metering devices which are connected respectively to sources of nitrogen and gaseous bis(difluoramino) difluoromethane and the outputs of which are merged and led through two bubblers in series. Each bubbler is approximately 1 inch in diameter and 10 inches in length. The first one contains 75 ml. of a solution of 10 grams of potassium iodide, 10 ml. of water and 80 ml. of acetonitrile, and the second contained 50 ml. of the same solution. On the downstream side of this continuous flow reactor there are connected, in series, a calcium sulphate drying tube, a −25° C. trap and a −196° C. trap.

A gaseous mixture of 30 percent by volume of bis (difluoramino) difluoromethane in nitrogen is metered into the continuous flow reactor at a rate of about 11.5 ml./minute for about 3.5 minutes after which the reactor is flushed for 45 minutes with nitrogen. The water in the product stream is removed downstream from the bubblers in the calcium sulphate drying tube, the acetonitrile is collected in the −25° C. receiver and the product is collected in a −196° C. trap. About 5.3 millimoles per hour of a product containing 91.2 percent of difluorodiazomethane are recovered.

The preparations of dichlorodifluoromethane and tetrafluoroethylene from difluorodiazomethane are carried out as follows:

About 0.0078 g. ($1 \times 10^{-4}$ mole) of difluorodiazomethane and 0.071 g. ($1 \times 10^{-3}$ mole) of chlorine are charged to a 50 ml. glass storage bulb, the glass being transmissive to ultraviolet irradiation down to approximately 3000 A. The gaseous mixture is irradiated from a distance of approximately 3 inches with a 125 watt ultraviolet lamp for a period of 7 hours. Comparison of the infrared spectra of the resulting product and of a known sample of dichlorodifluoromethane indicates a greater than 50 percent conversion to the latter.

A small sample of difluorodiazomethane is charged to a 15 ml. infrared cell having sodium chloride windows in either end thereof. The sample of difluorodiazomethane is sufficient to exert a pressure of 40 millimeters of mercury in the infrared cell at about 25° C. The contents of the infrared cell are then irradiated through the sodium chloride windows with a 125 watt ultraviolet lamp. The course of the reaction is followed by recording the infrared spectrum of the contents of the cell at specified time intervals. The decomposition of difluorodiazomethane being measured at the 6.41 micron band and the formation of the photolysis product, tetrafluoroethylene being measured at the 7.47 micron band. After 50 minutes of irradiation a conversion of approximately 38 percent has occurred and after 150 minutes of irradiation, the conversion is more than 90 percent complete to tetrafluoroethylene.

Dichlorodifluoromethane is useful as a refrigerant, a solvent and a fire extinguishing agent and tetrafluoroethylene can be polymerized to form highly useful materials.

EXAMPLE 2

Difluorodiazomethane prepared from perfluoroformamidine using various reducing agents A dry 5 cc. capacity heavy-walled glass ampoule is charged with 0.86 g. ($1.0 \times 10^{-3}$ mole) of dicyclopentadienyliron and 1.5 ml. of benzotrichloride. The ampoule is then cooled to liquid nitrogen temperature and the pressure therein reduced to not more than about 0.1 millimeter of mercury pressure. A sample amounting to 0.116 gram ($1.0 \times 10^{-3}$ mole) of perfluoroformamidine (prepared by method of S.N. 99,632, filed Mar. 30, 1961) is introduced, and the ampoule is sealed. The mixture is allowed to come to room temperature (i.e. about 25° C.) and is shaken at that temperature for 3 hours after which the tube is opened and the product is fractionated as in Example 1. The $-196°$ C. trap is found to contain $2.96 \times 10^{-4}$ mole of a mixture of volatile products. Infrared and chromatographic analyses of this crude mixture indicate that 78.9 percent of the material recovered in the trap is difluorodiazomethane.

A 20 ml. reaction flask is charged with 0.0338 g. ($2 \times 10^{-4}$ mole) of diphenylamine and an excess of a solvent consisting of 97 percent acetonitrile and 3 percent water. This mixture is then cooled and degassed as in Example 1 and 0.0116 g. ($1 \times 10^{-4}$ mole) of perfluoroformamidine is introduced into the flask, which is then sealed. The reaction mixture is then allowed to warm to room temperature (approximately 25° C.) and is stirred with a magnetic stirring bar for about one hour. Analysis of the product gases by vapor phase chromatography and infrared spectroscopy indicate that the major product is difluorodiazomethane.

0.0187 g. ($1.70 \times 10^{-4}$ mole) of hydroquinone, and 0.020 g. ($1.72 \times 10^{-4}$ mole) of perfluoroformamidne are reacted in the presence of an excess of an acetonitrile-water solvent as in the preparation described in the preceding paragraph except that stirring is continued only for about 30 minutes. Vapor phase chromatography indicates a yield of about 24 percent of the theoretical amount of difluorodiazomethane. The identity of this product is verified by comparison of its infrared spectrum with that of an authentic sample.

0.031 g. ($2.6 \times 10^{-4}$ mole) of potassium bromide and 0.015 g. ($1.29 \times 10^{-4}$ mole) of perfluoroformamidine are reacted in the presence of a solvent of 97 percent acetonitrile and 3 percent water as in the preparation described in the preceding paragraph except that stirring is continued for three hours. The infrared spectrum and vapor phase chromatography again indicate formation of difluorodiazomethane.

EXAMPLE 3

Perfluorodiazohexane

The reactions of this example are as follows:

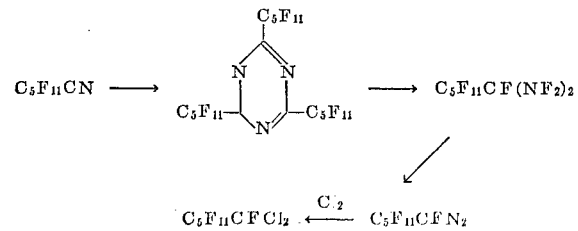

2,4,6 - tris(perfluoropentyl)1,3,5 - triazine is prepared from perfluorocapronitrile in a stainless steel pressure vessel of 300 milliliter capacity. 147.5 grams (0.5 mole) of perfluorocapronitrile ($C_5F_{11}CN$, prepared from perfluorocaproic acid according to the method of U.S. Patent 2,567,011) are condensed into the evacuated reaction vessel by transfer through a vacuum system line and the vessel is sealed. The reaction is carried out over a period of 100 hours during which time the temperature is maintained automatically at 350° C. The pressure in the reaction vessel rises to above 1000 p.s.i. and then decreases slightly during the remainder of the reaction time. The temperature is then raised to 400° C. for 16 hours and, finally, the vessel is cooled to room temperature and opened. The unreacted perfluorocapronitrile is removed and the higher boiling residue is poured from the reaction vessel and fractionated to give approximately 5 grams of 2,4,6-tris(perfluoropentyl)-1,3,5-triazine. This process is similar to those used by W. L. Reilly and H. C. Brown (Journal of Organic Chemistry, 22, 698 (1957)) for the preparation of certain other perfluoroalkyl triazines.

About 1.77 grams (0.002 mole) of thoroughly dried 2,4,6-tris(perfluoropentyl)-1,3,5-triazine are weighed into a copper tray which is placed in a 1.5 l. copper vessel of cylindrical shape. The reactor is closed, flushed with nitrogen and a stream of nitrogen containing 15–35 percent by volume of fluorine is passed through the reactor at a rate of about 0.04 moles of fluorine per hour for a period of 4 hours (the temperature being maintained at 0–25° C. during this time). Hydrogen fluoride is removed from the gas downstream from the reactor by passing it over solid sodium fluoride at 25° C. and the volatile products of the reaction are collected in a liquid air-cooled trap. The fluorine input is discontinued at the end of the four hour reaction time, but the nitrogen flow is continued for an additional three hours during which time the collection of volatile products from the reactor is continued.

The liquid in the trap (herein designated as A) is separated into fractions by connecting the trap (kept cold in liquid air) to a line passing serially through two receivers (herein designated B and C) then to a vacuum pump. The first receiver, B, is cooled to $-78°$ C. by a carbon dioxide-trichloroethylene bath and the second receiver, C, is cooled in liquid air. The liquid air bath surrounding the original trap, A, is removed and its contents are permitted to vaporize as the temperature gradually rises.

Fragments such as $CF_4$, $NF_3$, and $C_2F_6$ are collected in receiver C. The product in B is analyzed by vapor phase chromatography (using a polytrifluorochloroethylene oil as the continuous phase), nuclear magnetic resonance and infrared absorption spectroscopy. About 25 percent of the material in this trap is found to be a mixture of perfluorohexylamine, 1,1-bis(difluoramino) perfluorohexane and perfluoropentane. Separation of these products is accomplished by vapor phase chromatography.

A dry 5 cc. heavy-walled glass ampoule is charged with 0.120 gram of dicumenechromium and 2 ml. of dichlorodifluoromethane. The ampoule is then cooled to liquid nitrogen temperature and 0.0404 gram of 1,1-bis (difluoramino) perfluorohexane is introduced. The tube is sealed while under vacuum and the contents thereof are allowed to come to room temperature (about 25° C.). The resulting mixture is shaken for four days at room temperature. At the end of this time the ampoule is opened and the product is separated from the solvent by fractional distillation-condensation techniques using $-23°$, $-78°$ and $-196°$ C. receivers. Approximately $0.6 \times 10^{-4}$ moles of a volatile product is collected in the $-78°$ C. trap. This product contains a major proportion of perfluorodiazohexane and a minor amount of the unconverted starting material of 1,1-bis(difluoramino) perfluorohexane.

A sample amounting to $5 \times 10^{-4}$ moles of perfluorodiazohexane and $5 \times 10^{-3}$ moles of chlorine gas are charged to a 150 milliliter glass storage bulb, the glass being transmissive to ultraviolet irradiation down to approximately 3000 A. The gaseous mixture is irradiated from a distance of approximately 3 inches with a 125 watt ultraviolet lamp for a period of 7 hours. Vapor phase chromatographic analysis indicates a greater than 40 percent conversion to 1,1-dichloroperfluorohexane. Infrared and nuclear magnetic resonance spectra of the purified product are consistent with the assigned structure. This product is useful as a solvent, a dielectric, a hydraulic mechanism fluid and as a transfer fluid (as shown in U.S. Patent 2,658,928).

EXAMPLE 4

Perfluorodiazopropane

The reactions described in this example are as follows:

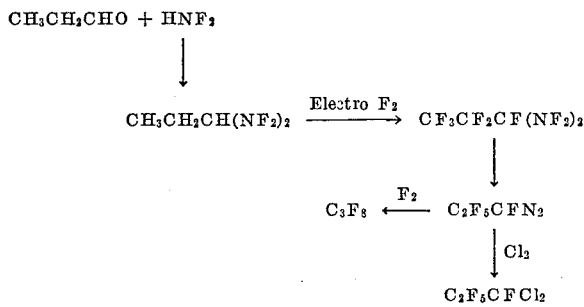

The preparation of 1,1-bis(difluoramino)propane is described in the Aerojet-General Corporation report under contract NONR–2655(00), ARPA order No. 170–61, Project Code 9100, report for the period December, 1960 through February, 1961, page 14, Confidential as follows:

15 milliliters of sulfuric acid was added slowly, with cooling to 1.45 grams (0.025 mole) of propionaldehyde in difluoroamine. The reaction flask was attached to a vacuum pump through a $-80°$ C. trap. The difluoroamine was allowed to distill off at ambient conditions from the mixture collected in the trap. The residue of the material remaining in the trap gave two fractions, B.P. 25° C./260 millimeters and a higher boiling material. The compound boiling at 25° C./260 millimeters was assigned the structure 1,1 - bis(difluoramino)propane. Calculated for $C_3H_6N_2F_4$: C, 24.6; H, 4.11; N, 19.2. Found: C, 23.0; H, 4.38; N, 18.1.

1,1 - bis(difluoramino)perfluoropropane is prepared from 1,1-bis(difluoramino)propane by the electrochemical fluorination process described in U.S. Patent No. 2,519,983. A simple electrolytic cell is used which is provided with a nickel anode, an iron cathode, an upper outlet for gaseous products, an upper inlet for charging materials, a bottom outlet for liquid products and a cooling jacket for maintaining the desired operating temperature. The starting compound is soluble in liquid hydrogen fluoride and provides adequate electrolytic conductivity. The electrochemical cell is run at atmospheric pressure and a temperature of 0° C. The cell is initially charged with about 75 ml. of anhydrous liquid hydrogen fluoride and about 3 grams of the precursor. During the run additional precursor is added to maintain current flow. The average cell voltage is 5.5 volts D.C. The run duration is about 24 hours with a current flow of about one ampere. The product stream from the cell is led through a tube packed with sodium fluoride and then into a trap cooled by solid carbon dioxide where the product is collected together with the volatile cell products. The crude product is subjected to fractional distillation and there is obtained a fraction identified as essentially pure 1,1-bis(difluoramino)perfluoropropane. Final purification is effected by vapor phase chromatography. The pure product boils at about 30° C.

1.17 grams ($4.0 \times 10^{-3}$ mole) of dicumene chromium are weighed out into a 20 ml. heavy walled ampoule and 8 ml. of xylene hexafluoride are added. A 0.254 gram ($1 \times 10^{-3}$ mole) sample of 1,1-bis(difluoramino)perfluoropropane is added to the mixture at $-195°$ C. by vacuum transfer techniques, and the ampoule sealed under vacuum. The ampoule is allowed to warm to about 25° C. and is kept at that temperature for six days, during which time it is shaken periodically. The ampoule is then cooled to liquid nitrogen temperature, opened and its contents subjected to separation by fractional distillation-condensation techniques employing $-23°$ C. and $-196°$ C. receivers. The solvent, xylene hexafluoride, is trapped in the $-23°$ C. receiver. The $-196°$ C. receiver contains about a 30 percent yield of perfluorodiazopropane which boils at about 10° C. The fluorine nuclear magnetic resonance and infrared spectra are consistent with the assigned structure.

About $1 \times 10^{-3}$ mole of perfluorodiazopropane and $5 \times 10^{-3}$ mole of fluorine gas are charged to a 150 milliliter glass storage bulb, the glass being transmissive to ultraviolet irradiation down to approximately 3000 A. The gaseous mixture is irradiated from a distance of approximately 3 inches with a 125 watt ultraviolet lamp for a period of 4 hours. Vapor phase chromatographic analysis indicates a greater than 65 percent conversion to perfluoropropane. Comparison of the infrared spectra of the resulting purified product and of a known sample of perfluoropropane confirms the assigned structure. As shown in U.S. Patent 2,456,027, this product is useful as a refrigerant, as a low temperature heat transfer liquid and as a low temperature solvent.

About $3 \times 10^{-4}$ mole of perfluorodiazopropane and $3 \times 10^{-3}$ mole of gaseous chlorine are charged to a 100 milliliter glass storage bulb, the glass being transmissive to ultraviolet irradiation down to approximately 3000 A. The gaseous mixture is irradiated from a distance of approximately 3 inches with a 125 watt ultraviolet lamp for a period of 7 hours. Vapor phase chromatographic analysis indicates a greater than 40 percent conversion to 1,1-dichloroperfluoropropane.

This compound is useful as a refrigerant, as a solvent, and as a reaction medium (see U.S. Patent 2,466,189).

EXAMPLE 5

1-chloro-perfluoro-2-diazopropane

The reactions described in this example are as follows:

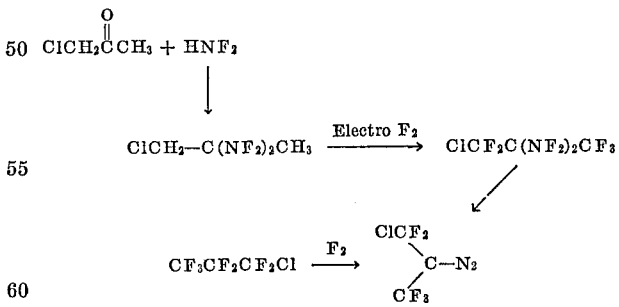

The preparation of 1 - chloro-2,2-bis(difluoramino) propane is as follows:

Chloroacetone (2.3 grams, 0.025 mole) was added slowly to a refluxing mixture of about 8 grams of difluoroamine and 16 milliliters of sulfuric acid. After the excess diafluoroamine was removed, the product was transferred into a $-80°$ C. trap at 5 milliliters to yield 2.7 grams of a colorless liquid. Distillation gave 2.3 grams (0.016 mole, 70 percent yield) of 1-chloro-2,2-bis(difluoramino) propane, B.P. 41° C./60 millimeters. Calculated for $C_3H_5N_2F_4Cl$: C, 19.9; H, 2.77; N, 15.5. Found: C, 19.7; H, 2.85; N. 14.9.

1-chloro-2,2-bis(difluoramino)perfluoropropane is prepared from 1-chloro-2,2-bis(difluoramino)propane by the electrochemical fluorination process. The apparatus and procedure described in Example 4 are utilized. The crude product collected in the Dry Ice-cooled trap is subjected to fractional distillation and then vapor phase chromatography to obtain the essentially pure 1-chloro-2,2-difluoramino)perfluoropropane which boils at about 55° C.

Into a 20 ml. ampoule, containing 1.154 grams 6.2× 10$^{-3}$ mole) of dicyclopentadienyliron and 10 ml. of carbon tetrachloride, cooled to −196° C., is added 0.405 gram 1.5×10$^{-3}$ mole) of 1-chloro-2,2-bis(difluoroamino)perfluoropropane by vacuum transfer techniques and the ampoule is sealed under vacuum. The ampoule is allowed to warm to about 25° C. is kept at that temperature for four days, during which time it is shaken periodically. The ampoule is then cooled to liquid nitrogen temperature, opened and its contents subjected to separation by fractional distillation-condensation techniques employing −78° C. and −196° C. receivers. The carbon tetrachloride is collected in the −78° C. receiver and the 1-chloroperfluoro-2-diazopropane in the −196° C. receiver. The pure product (boiling at about 28° C.), obtained in about a 45 percent yield after vapor phase chromatography, has infrared and fluorine nuclear magnetic resonance spectra consistent with the assigned structure.

About 1×10$^{-3}$ mole of 1-chloroperfluoro-2-diazopropane and 3×10$^{-3}$ mole of gaseous fluorine are charged to a 100 milliliter glass storage bulb, the glass being transmissive to ultraviolet irradiation down to approximately 3000 A. The gaseous mixture is irradiated from a distance of approximately 3 inches with a 125 watt ultraviolet lamp for a period of 3 hours. Vapor phase chromatographic analysis indicates a greater than 30 percent yield of 1-chloroperfluoropropane. Comparison of the infrared spectrum of the purified product and an authentic sample of 1-chloroperfluoropropane confirms the assigned structure. This product is useful as a heat transfer medium, as a liquid coolant, as an inert reaction medium and as a refrigerant. (See U.S. Patent 2,490,764.)

EXAMPLE 6

Perfluoro-3-diazopentane

The reactions described in this example are as follows:

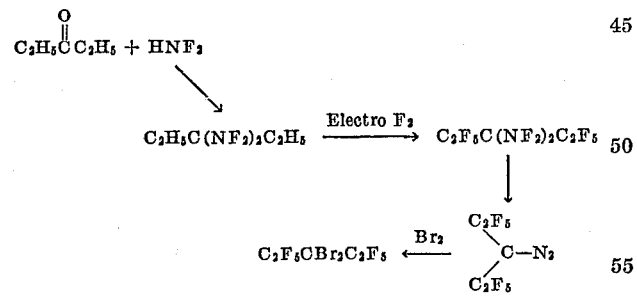

The preparation of 3,3-bis(difluoramino)pentane is as follows:

To a refluxing mixture of difluoramine (about 9 grams) and sulfuric acid (16 milliliters), 2.15 grams (0.025 mole) of 3-pentanone was added. A layer separated during the addition. After the excess difluoramine was removed, the product was vacuum-transferred into a −80° C. trap at 10 millimeters of pressure. This product was distilled to give 1.4 grams (0.008 mole, 32 percent yield) of 3,3-bis(difluoramino)pentane, B.P. 40–41° C./30 millimeters. Calculated for $C_5H_{10}N_2F_4$: C, 34.4; H, 5.8; N, 16.1. Found: C, 34.4; H, 6.50; N, 16.1.

3,3-bis(difluoramino)perfluoropentane is prepared from 3-3-bis(difluoramino)pentane by the electrochemical fluorination process. The apparatus and procedure described in Example 4 are utilized. The crude product collected in the Dry Ice-cooled trap is subjected to fractional distillation and then vapor phase chromatography to obtain the essentially pure 3,3-bis(difluoramino) perfluoropentane which boils at about 80° C. The infrared absorption spectrum and the fluorine nuclear magnetic resonance spectrum are also consistent with the structure of 3,3-bis(difluoramino)perfluoropentane.

A 10 cc. capacity heavy-walled glass ampoule is charged with 0.546 gram (3.5×10$^{-3}$ moles) of potassium iodide dissolved in 5 milliliters of a solution of 97 percent acetonitrile and 3 percent water (by volume). This mixture is cooled to liquid nitrogen temperature and degassed by reducing the pressure in the ampoule to not more than about 0.1 mm. of mercury pressure. A 0.354 gram (1.0×10$^{-3}$ mole) sample of 3,3-bis(difluoramino) perfluoropentane is then introduced into the ampoule by condensation and the ampoule is sealed. At the end of a one-day period of standing at room temperature with occasional shaking, the ampoule is cooled to −196° C. and its contents subjected to fractional distillation-condensation. Final purification of the crude product, collected in the −196° C. receiver, is affected by vapor phase chromatography. An approximately 20 percent yield of perfluoro-3-diazopentane, boiling at about 55° C., was collected.

A sample of perfluoro-3-diazopentane amounting to 5×10$^{-4}$ mole and 5×10$^{-3}$ mole of bromine are charged to a 600 milliliter glass storage bulb, the glass of the bulb admitting ultraviolet irradiation down to approximately 3000 A. The gaseous mixture is irradiated from a distance of approximately 3 inches with a 125 watt ultraviolet lamp filtered through an ultraviolet filter (which is transmissive from 3000 to 4000 A. with maximum transmission of 70 percent at 3500 A.) for a period of 7 hours. Vapor phase chromatographic analysis indicates a greater than 20 percent yield of 3,3-dibromoperfluoropentane. Infrared and nuclear magnetic resonance spectra of the purified product are consistent with the assigned structure. This compound is particularly useful as a solvent, see U.S. Patent 2,716,141.

EXAMPLE 7

Perfluorodiazocyclohexane

The reactions described in this example are as follows:

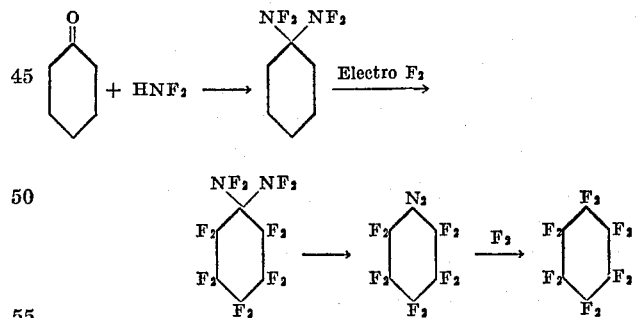

The preparation of 1,1-bis(difluoramino)cyclohexane is as follows:

Cyclohexanone (2.45 grams, 0.025 mole) was added to a refluxing mixture of about 8 grams of difluoroamine and 16 milliliters of concentrated sulfuric acid. After the excess difluoroamine was removed, the product was vacuum transferred into a −80° C. trap at 1 milliliter and distilled to afford 1.45 grams (0.0077 mole, 31 percent yield) of 1,1-bis(difluoramino) cyclohexane B.P. 44° C./7 millimeters. Calculated for $C_6H_{10}N_2F_4$: C, 38.6; H, 5.4; N, 15.0. Found: C, 33.9; H, 5.75; N, 15.0.

1,1-bis(difluoramino)perfluorocyclohexane is prepared from 1,1-bis(difluoramino)cyclohexane by the electrochemical fluorination process. The apparatus and procedure described in Example 4 are utilized except that the product is removed from the cell in a liquid mixture which is treated with lime to remove hydrogen fluoride and is then fractionally distilled to recover the desired product in somewhat impure form. Pure 1,1-bis(difluoramino) perfluorocyclohexane is obtained by vapor phase chromatographic separation of the distillate. The purified material, boiling at about 90° C., exhibits the expected infrared and nuclear magnetic resonance spectra.

To a dry 30 ml. heavy walled ampoule which contains 0.893 gram ($4.8 \times 10^{-3}$ mole) of dicyclopentadienyliron and 15 ml. of dichlorodifluoromethane, cooled to liquid nitrogen temperature, is added 0.439 gram ($1.2 \times 10^{-3}$ mole) of 1,1-bis(difluoramino) perfluorocyclohexane. The ampoule is sealed, allowed to warm to room temperature and shaken occasionally over a period of four days. The reaction mixture is separated by fractional distillation-condensation techniques employing receivers cooled to $-78°$ C. and $-196°$ C. The contents of the $-78°$ C. receiver are subsequently separated by vapor phase chromatography to afford a pure product identified as perfluorodiazocyclohexane, boiling at about 75° C.

About $1 \times 10^{-4}$ mole of perfluorodiazocyclohexane and $5 \times 10^{-4}$ mole of gaseous fluorine are charged to a 150 milliliter glass storage bulb, the glass being transmissive to ultraviolet irradiation down to approximately 3000 A. The gaseous mixture is irradiated from a distance of approximately 3 inches with a 125 watt ultraviolet lamp for a period of 5 hours. Comparison of the infrared spectra of the resulting purified product and of a known sample of perfluorocyclohexane indicates a greater than 50 percent conversion to the latter. This material is useful as a solvent, a fire extinguishing fluid, an extraction medium, an inert medium for chemical reactions, and a heat transfer medium (see U.S. Patent 2,456,027).

EXAMPLE 8

3,4-dichloroperfluorodiazobutane

The reactions of this example are as follows:

ClCF₂CFClCF₂CN ⟶

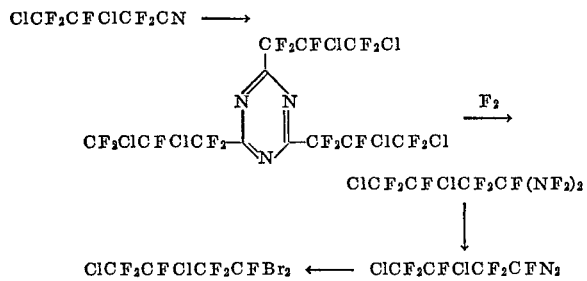

ClCF₂CFClCF₂CFBr₂ ⟵ ClCF₂CFClCF₂CFN₂

In a steel bomb of 200 milliliter capacity are placed 114 grams (0.5 mole) of dry 3,4-dichloroperfluorobutyronitrile (prepared by the dehydration of the corresponding amide of the perchorofluorocarboxylic acid with phosphorus pentoxide according to the process of U.S. Patent No. 2,788,362) and 5 grams (0.0375 mole) of powdered anhydrous aluminum chloride. 13 grams (0.49 mole) of gaseous hydrogen chloride are added, the bomb being cooled to absorb the heat of solution. The bomb is then sealed and rotated for 5 hours during which time it is maintained below 150° C., and at the end of this time opened and the hydrogen chloride is allowed to escape. The solid residue is melted and discharged into 1 liter of hot water. The aqueous mixture is stirred vigorously, cooled and the water is decanted. The remaining 2,4,6-tris(2,3-dichloroperfluoropropyl)-1,3,5-triazine is thoroughly dried for fluorination.

About 1.37 grams (0.002 mole) of thoroughly dried 2,4,6-tris(2,3-dichloroperfluoropropyl)-1,3,5-triazine are weighed into a copper tray which is placed in a 1.5 l. copper vessel of cylindrical shape. The reactor is closed, flushed with nitrogen and a stream of nitrogen containing 15–35% by volume of fluorine is passed through the reactor at a rate of about 0.04 mole of fluorine per hour for a period of 5 hours (the temperature being maintained at about 0–25° C. during this time). Hydrogen fluoride is first removed from the gas downstream from the reactor by passing it over solid sodium fluoride at 25° C. and the volatile products of the reaction are collected in a liquid air-cooled trap. The fluorine input is discontinued at the end of the five hour reaction time, but the nitrogen flow is continued for an additional three hours during which time the collection of volatile products from the reactor is continued.

The liquid in the trap (herein designated as A) is separated into fractions by connecting the trap (kept cold in liquid air) to a line passing serially through two receivers (herein designated B and C) then to a drying tube. The first receiver B, is cooled to $-78°$ C. by a carbon dioxide-trichloroethylene bath and the second receiver, C, is cooled in liquid air. The liquid air bath surrounding the original trap, A, is removed and its contents are permitted to vaporize as the temperature gradually rises. Fragments such as $CF_4$, $CF_3Cl$, $NF_3$, and $C_2F_6$ are collected in receiver C. The product in C is analyzed by vapor phase chromatography (using a polytrifluorochloroethylene oil as the continuous phase) nuclear magnetic resonance and infrared absorption spectroscopy. The major part of the product in B is made up of polychlorofluoroethanes and propanes and about 20 percent of it is found to be a mixture of 1,2-dichloroperfluorobutane, 4,5-dichloroperfluorobutylamine and 1,1-bis(difluoramino)-3,4-dichloroperfluorobutane. Separation of these products, accomplished by vapor phase chromatography, affords the pure 1,1-bis(difluoramino)-3,4-dichloroperfluorobutane boiling at about 101° C.

Into a 10 ml. ampoule containing a mixture of 0.337 gram ($1.0 \times 10^{-3}$ of dicyclopentadienyliron and 5 ml. of fluorotrichloromethane at $-196°$ C. is condensed 0.782 gram ($4.2 \times 10^{-3}$ mole) of 1,1-bis(difluoramino)-3,4-dichloroperfluorobutane. The ampoule is sealed under vacuum, allowed to warm to 25° C. and is maintained at that approximate temperature over a seven-day period during which time it is shaken occasionally. The ampoule is then opened and the solvent removed by fractional distillation-condensation employing $-78°$ C. and $-197°$ C. receivers. The contents of the $-78°$ C. receiver are subjected to vapor phase chromatographic separation to afford an approximate of 35 percent of pure 3,4-dichloroperfluorodiazobutane boiling at about 82° C. The infrared absorption spectrum of this product exhibits a band characteristic of the diazo moiety.

About $1 \times 10^{-4}$ mole of 3,4-dichloroperfluorodiazobutane and $1 \times 10^{-3}$ mole of bromine are charged to a 150 milliliter glass storage bulb, the glass being transmissive to ultraviolet irradiation down to approximately 3000 A. The gaseous mixture is irradiated from a distance of approximately 3 inches with a 125 watt ultraviolet lamp for a period of 5 hours. An ultraviolet filter, which is transmissive from 3000 to 4000 A. is also employed. The reaction mixture is separated by fractional distillation-condensation techniques to afford a greater than 15 percent yield of relatively pure 1,1-dibromo-3,4-dichloroperfluorobutane. Infrared and nuclear magnetic resonance spectra are consistent with the assigned structure. This product is particularly useful as a solvent.

What is claimed is:

1. A compound having the formula:

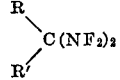

wherein R is selected from the class consisting of perhalocarbon groups containing from 1 to 6 carbon atoms in which not less than 60 percent of the halogen atoms are fluorine and the remainder are chlorine, R' is selected from the class consisting of R and fluorine, and wherein R and R' can combine to form five and six membered perfluorocycloaliphatic rings through the carbon atom to which they are attached.

2. A compound having the formula:

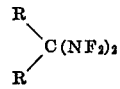

wherein each R is a perhalocarbon group containing from 1 to 6 carbon atoms in which not less than 60 percent of the halogen atoms are fluorine and the remainder are chlorine.

3. A compound having the formula:

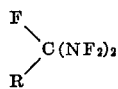

wherein R is a perhalocarbon group containing from 1 to 6 carbon atoms in which not less than 60 percent of the halogen atoms are fluorine and the remainder are chlorine.

4. 3,3-bis(difluoramino)perfluoropentane.
5. 1,1-bis(difluoramino)perfluoropropane.
6. 1,1-bis(difluoramino)perfluorohexane.
7. 1,1-bis(difluoramino)-3,4-dichloroperfluorobutane.
8. 1,1-bis(difluoramino)perfluorocyclohexane.

References Cited

UNITED STATES PATENTS

| | | | |
|---|---|---|---|
| 2,996,500 | 8/1961 | Ehrlich et al. | 260—239 |
| 2,710,862 | 6/1959 | Schroeder | 260—239 |
| 2,795,615 | 6/1957 | Husted et al. | 260—583 |
| 2,691,043 | 10/1954 | Husted et al. | 260—583 |

CHARLES B. PARKER, *Primary Examiner.*

P. IVES, *Assistant Examiner.*

U.S. DEPARTMENT OF COMMERCE

PATENT OFFICE

Washington, D.C. 20231

UNITED STATES PATENT OFFICE

CERTIFICATE OF CORRECTION

Patent No. 3,407,232                                   October 22, 1968

Ronald A. Mitsch

It is certified that error appears in the above identified patent and that said Letters Patent are hereby corrected as shown below:

Column 5, line 20, "eptane" should read -- heptane --. Column 7, line 15, "0.86 g." should read -- 0.186 g. --.

Signed and sealed this 10th day of March 1970.

(SEAL)
Attest:

Edward M. Fletcher, Jr.                           WILLIAM E. SCHUYLER, JR.
Attesting Officer                                           Commissioner of Patents